(12) United States Patent
Ryu et al.

(10) Patent No.: US 9,417,055 B2
(45) Date of Patent: Aug. 16, 2016

(54) APPARATUS FOR MEASURING THICKNESS OF THIN FILM, SYSTEM INCLUDING THE APPARATUS, AND METHOD FOR MEASURING THICKNESS OF THIN FILM

(71) Applicant: SAMSUNG ELECTRONICS CO., LTD., Suwon-si (KR)

(72) Inventors: Sung-Yoon Ryu, Hwaseong-si (KR); Sang-Kil Lee, Yongin-si (KR); Chung-Sam Jun, Suwon-si (KR); Woo-Seok Ko, Seoul (KR); Ho-Jeong Kwak, Suwon-si (KR); Souk Kim, Seoul (KR); Kwan-Woo Ryu, Seoul (KR); Yu-Sin Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/799,107

(22) Filed: Jul. 14, 2015

(65) Prior Publication Data
US 2016/0061583 A1 Mar. 3, 2016

(30) Foreign Application Priority Data
Aug. 28, 2014 (KR) .................. 10-2014-0113297

(51) Int. Cl.
*G01B 11/28* (2006.01)
*G01B 11/06* (2006.01)
(52) U.S. Cl.
CPC .................. *G01B 11/0633* (2013.01)
(58) Field of Classification Search
CPC .................. G01B 11/06; G01N 21/211; G01N 2021/1725; G01N 21/1702; G01N 2021/213; G01N 21/8422; G01N 21/21; G01N 2021/148; G01N 21/274

USPC .................................. 356/630–632
See application file for complete search history.

(56) References Cited

U.S. PATENT DOCUMENTS

| 6,885,467 B2 | 4/2005 | Du-Nour et al. |
| 6,912,056 B2* | 6/2005 | Hyun ................. G01B 11/0641 250/559.27 |
| 7,321,426 B1 | 1/2008 | Poslavsky et al. |
| 7,483,147 B2 | 1/2009 | Kim et al. |
| 7,821,655 B2* | 10/2010 | Janos ................. G01B 11/0675 156/345.1 |
| 8,409,349 B2 | 4/2013 | Ohkubo |

(Continued)

FOREIGN PATENT DOCUMENTS

| JP | 2000-213919 A | 8/2000 |
| JP | 2000-292128 A | 10/2000 |

(Continued)

*Primary Examiner* — Hoa Pham
(74) *Attorney, Agent, or Firm* — Sughrue Mion, PLLC

(57) ABSTRACT

An apparatus and a system for measuring the thickness of a thin film are provided. The apparatus includes a signal detector, a Fast Fourier Transform (FFT) generator, an Inverse Fast Fourier Transform (IFFT) generator, and a thickness analyzer. The signal detector detects an electric field signal with respect to a reflected light that is reflected from a thin film. The FFT generator performs FFT with respect to the electric field signal to separate a DC component from an AC component of the electric field signal. The IFFT generator receives the separated AC component of the electric field signal, performs IFFT with respect to the AC component, and extracts a phase value of the AC component. The thickness analyzer measures the thickness of the thin film using the extracted phase value.

20 Claims, 17 Drawing Sheets

(56) References Cited

U.S. PATENT DOCUMENTS

| | | | |
|---|---|---|---|
| 8,450,689 B2 | 5/2013 | Ohtake et al. | |
| 9,255,789 B2 * | 2/2016 | Park | G01B 11/0633 |
| 2012/0176623 A1 | 7/2012 | Lee et al. | |
| 2013/0335747 A1 * | 12/2013 | Haitjema | G01B 9/02088 |
| | | | 356/503 |
| 2013/0345992 A1 * | 12/2013 | Chatellier | G01L 1/10 |
| | | | 702/43 |

FOREIGN PATENT DOCUMENTS

| | | |
|---|---|---|
| JP | 2003-279324 A | 10/2003 |
| JP | 2011-071415 A | 4/2011 |
| KR | 10-0647493 B1 | 11/2006 |
| KR | 10-0699317 B1 | 3/2007 |
| KR | 10-0721810 B1 | 5/2007 |
| KR | 10-2007-0113655 A | 11/2007 |

* cited by examiner

APPARATUS FOR MEASURING THICKNESS OF THIN FILM, SYSTEM INCLUDING THE APPARATUS, AND METHOD FOR MEASURING THICKNESS OF THIN FILM

CROSS-REFERENCE TO RELATED APPLICATIONS

This application claims priority from Korean Patent Application No. 10-2014-0113297, filed on Aug. 28, 2014 in the Korean Intellectual Property Office, the disclosure of which is incorporated by reference herein in its entirety.

BACKGROUND

1. Field

Apparatuses, systems and methods consistent with exemplary embodiments relate measuring the thickness of a thin film.

2. Description of the Related Art

Measurement of the thickness of a thin film or a film material in a semiconductor process is necessary to determine inferiority of the process. The process quality and productivity can be improved by measuring the thickness of a thin film or a film material and receiving a feedback of test results of a semiconductor substrate. For this, non-contact non-destructive measurement equipment may be used to measure the thickness using X-rays, sound waves, or light without processing or modifying a test material, such as a semiconductor substrate, to be measured.

Such a thickness measurement technology has been developed to meet a demand for measurement of the thickness of more precise and complicated patterns with the flow of the times.

SUMMARY

One or more exemplary embodiments provide an apparatus to measure the thickness of a thin film using skew Inverse Fast Fourier Transform (IFFT), and more particularly, an apparatus for measuring the thickness of the thin film, which can measure the thickness of the thin film at high speed and with high sensitivity in comparison to the use of Fast Fourier Transform (FFT).

Further, one or more exemplary embodiments provide a system for measuring the thickness of a thin film that includes an apparatus for measuring the thickness of a thin film at high speed and with high sensitivity using skew IFFT.

Further still, one or more exemplary embodiments provide a method for measuring the thickness of a thin film, which can measure the thickness of the thin film using skew IFFT.

According to an aspect of an exemplary embodiment, there is provided an apparatus for measuring a thickness of a thin film. The apparatus includes a signal detector, a Fast Fourier Transform (FFT) generator, an Inverse Fast Fourier Transform (IFFT) generator, and a thickness analyzer. The signal detector is configured to detect an electric field signal with respect to a reflected light that is reflected from a thin film. The FFT generator is configured to perform FFT with respect to the electric field signal to separate a DC component from an AC component of the electric field signal. The IFFT generator is configured to receive the separated AC component of the electric field signal, perform IFFT with respect to the AC component, and extract a phase value of the AC component. The thickness analyzer is configured to measure the thickness of the thin film using the extracted phase value.

According to an aspect of another exemplary embodiment, there is provided a system for measuring a thickness of a thin film. The system includes a light source, a light sensor, a phase value extractor, and a thickness analyzer. The light source is configured to provide light to a substrate on which a thin film is deposited. The light sensor is configured to receive a first reflected light that is reflected from the substrate and sense a first electric field signal of the first reflected light. The phase value extractor is configured to perform an FFT and an IFFT with respect to the first electric field signal to extract a first phase value of an AC component of the first electric field signal. The thickness analyzer is configured to obtain a first slope of the first phase value to measure the thickness of the thin film. The thickness analyzer further obtains a second slope of a second phase value that is extracted from a second electric field signal of a second reflected light that is reflected from the substrate before the thin film is deposited, and measures the thickness of the thin film based on the first slope and the second slope.

According to an aspect of another exemplary embodiment, there is provided a method of determining a thickness of a thin film. The method comprises detecting a first electric field signal with respect to a first reflected light that is reflected from a workpiece before depositing of the thin film; performing an FFT on the first electric field signal to separate a DC component from an AC component of the first electric field signal; performing an IFFT on the AC component to extract a first phase value of the AC component; depositing the thin film on the workpiece; detecting a second electric field with respect to a second reflected light that is reflected from the workpiece after depositing the thin film on the workpiece; performing FFT on the second electric field signal to separate a DC component from an AC component of the second electric field signal; performing IFFT on the AC component of the second electric field signal to extract a second phase value of the AC component; determining a thickness of the thin film using the first phase value and the second phase value.

BRIEF DESCRIPTION OF THE DRAWINGS

The above and/or other aspect will be more apparent from the following detailed description taken in conjunction with the accompanying drawings, in which.

DETAILED DESCRIPTION

Figure 1:
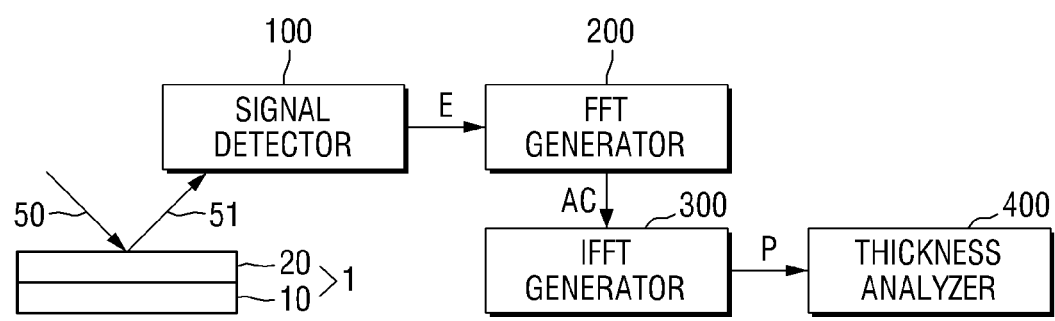
FIG. 1 is a block diagram schematically illustrating an apparatus for measuring the thickness of a thin film according to an exemplary embodiment.

Exemplary embodiments of the present inventive concept will now be described more fully hereinafter with reference to the accompanying drawings, in which exemplary embodiments are shown. This present inventive concept may, however, be embodied in different forms and should not be construed as limited to the exemplary embodiments set forth herein. Rather, these exemplary embodiments are provided so that this disclosure will be thorough and complete, and will filly convey the scope of the present inventive concept to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the exemplary embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this present inventive concept belongs. It is noted that the use of any and all examples, or exemplary terms provided herein is intended merely to better illuminate the exemplary embodiments and is not a limitation on the scope of the present inventive concept unless otherwise specified. Further, unless defined otherwise, all terms defined in generally used dictionaries may not be overly interpreted.

The exemplary embodiments will be described with reference to perspective views, cross-sectional views, and/or plan views, in which the exemplary embodiments are shown. Thus, the profile of an exemplary view may be modified according to manufacturing techniques and/or allowances. That is, the exemplary embodiments are not intended to be limiting in scope but rather cover all changes and modifications that can be caused due to a change in manufacturing process. Thus, regions shown in the drawings are illustrated in schematic form and the shapes of the regions are presented simply by way of illustration and not as a limitation.

In order to complete a semiconductor chip through a semiconductor manufacturing process, media having various characteristics are used as thin films. Depending on such a process, the thickness of such thin films may be changed, and the change of the thin film thickness may exert an influence on the subsequent process to deteriorate the performance of the whole semiconductor chip. Accordingly, it is advantageous to measure the thickness of a thin film that is deposited during the process, and according to the exemplary embodiments, in order to measure the thickness of a thin film at high speed and with high sensitivity, the thickness of the thin film is measured using skew Inverse Fast Fourier Transform (IFFT).

According to the skew IFFT, the thickness of a thin film is measured by performing an IFFT with respect to data that is filtered in the vicinity of a peak position of FFT data of a spectrum and then operating a slope of acquired phase values. Accordingly, it is possible to measure the thin film thickness at high speed and with high sensitivity in comparison to a measurement using FFT.

Depending on the target thickness, medium, and measurement steps of a thin film of which the thickness is to be measured, the wavelength band of light that is sensitive to the change of the thin film thickness may be changed. According to exemplary embodiments, the wavelength band, in which the thickness value of a target thin film to be measured can be measured with highest sensitivity, can be selected through slope analysis of the phase values measured after the IFFT is performed.

In the case of using a measurement according to exemplary embodiments, monitoring of the thin film thickness according to the process change of various thin films can be performed at high speed and with high sensitivity, and thus the yield can be improved in manufacturing semiconductor wafers.

Figure 2:
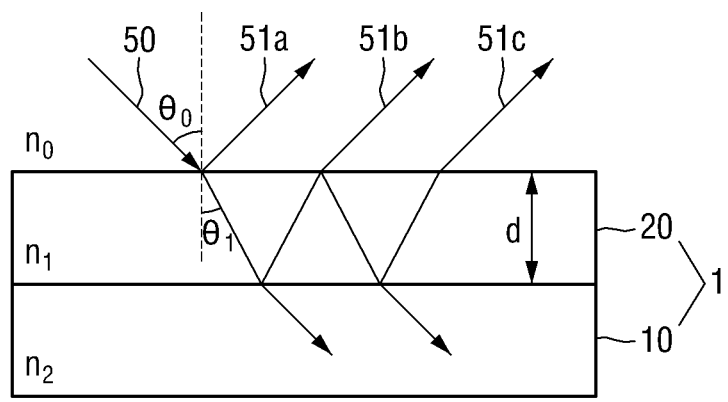
FIG. 2 is a diagram illustrating reflected light that is reflected from a thin film.
Figure 3:
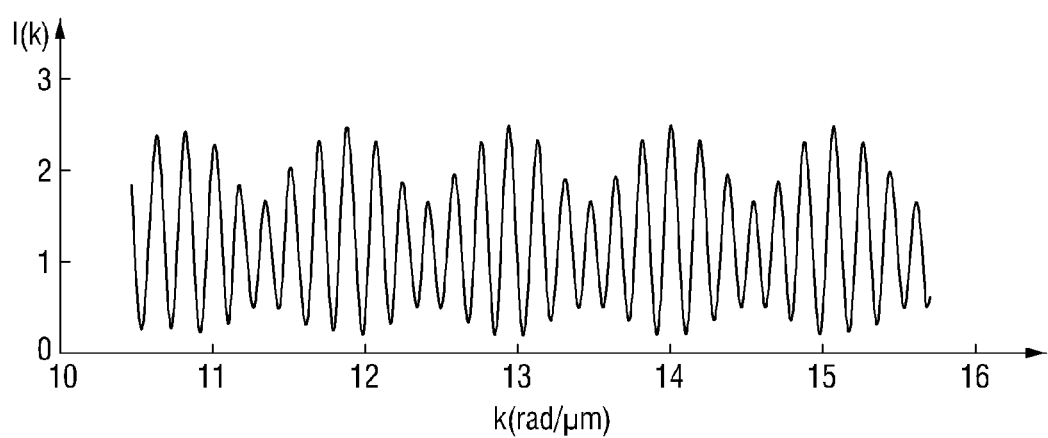
FIG. 3 is a graph illustrating light intensity per wavelength of reflected light that is reflected from a thin film.
Figure 4:
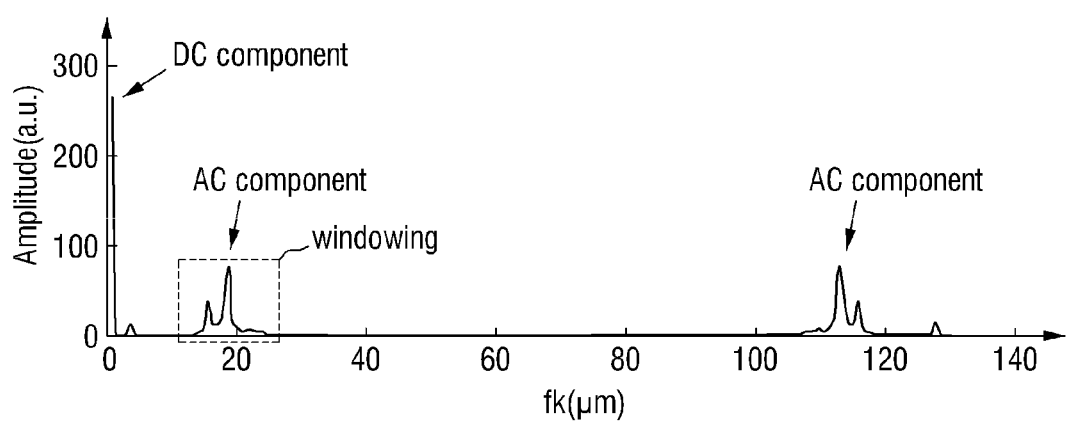
FIG. 4 is a graph illustrating a result of performing FFT with respect to reflected light that is reflected from a thin film.
Figure 5:
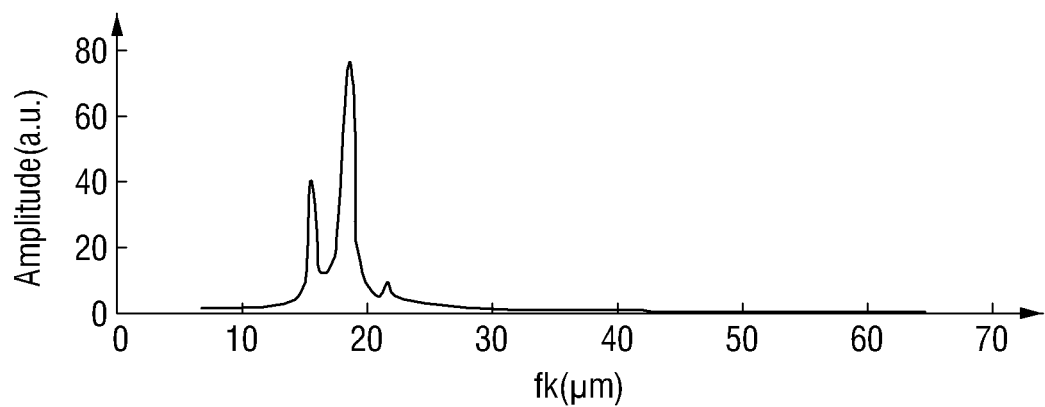
FIG. 5 is a graph illustrating AC components of reflected light that is reflected from a thin film.
Figure 6:
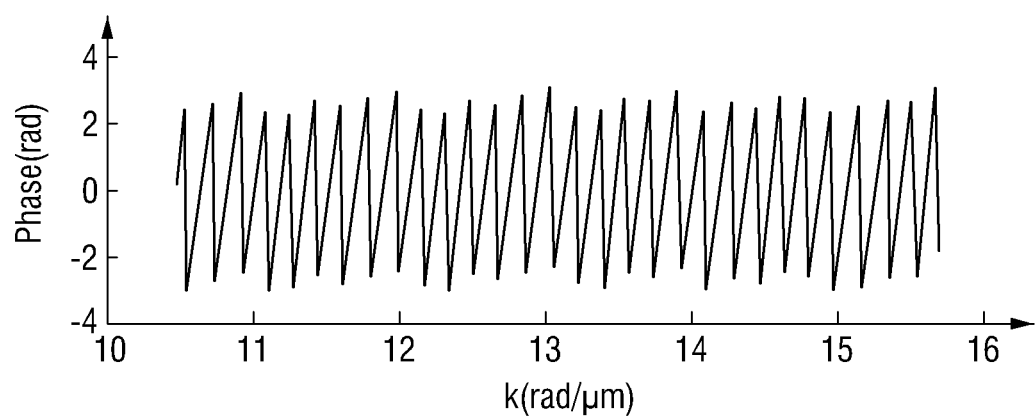
FIG. 6 is a graph illustrating phase values acquired after performing IFFT with respect to the AC components of FIG. 5.
Figure 7:
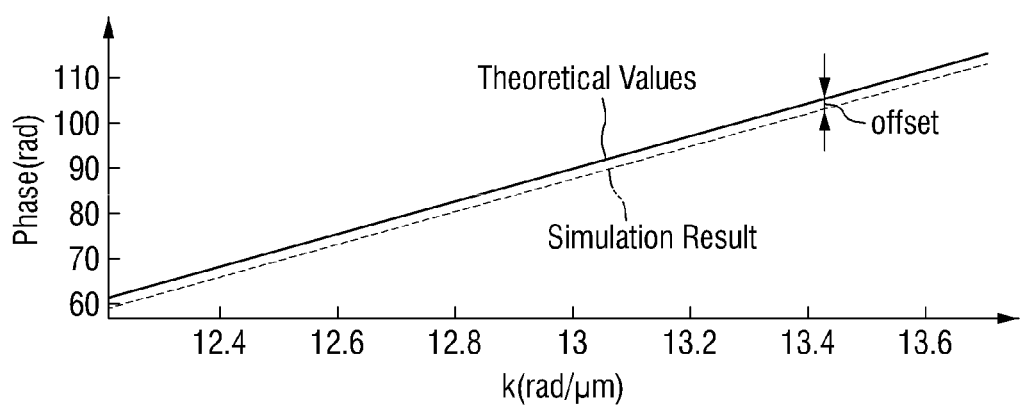
FIG. 7 is a graph illustrating a result of unwrapping the phase values of FIG. 6.

FIG. 1 is a block diagram schematically illustrating an apparatus for measuring the thickness of a thin film according to an exemplary embodiment. FIG. 2 is a diagram illustrating reflected light that is reflected from a thin film. FIG. 3 is a graph illustrating light intensity per wavelength of a reflected light that is reflected from a thin film, and FIG. 4 is a graph illustrating a result of performing FFT with respect to reflected light that is reflected from a thin film. FIG. 5 is a graph illustrating AC components of reflected light that is reflected from a thin film, and FIG. 6 is a graph illustrating phase values acquired after performing IFFT with respect to the AC components of FIG. 5. FIG. 7 is a graph illustrating a result of unwrapping the phase values of FIG. 6.

Referring to FIG. 1, an apparatus for measuring the thickness of a thin film according to an exemplary embodiment includes a signal detector 100, a Fast Fourier Transform (FFT) generator 200, an Inverse Fast Fourier Transform (IFFT) generator 300, and a thickness analyzer 410.

The signal detector 100 detects an electric field signal E of reflected light 51 that is reflected from a workpiece 1. The workpiece 1 may include a substrate 10 and/or a thin film 20. Referring to FIG. 2, the electric field signal E will be explained. The electric field signal E may be indicated as a sum of electric field signals that are multi-reflected from respective boundary surfaces in a film structure including a substrate 10 and the thin film 20.

That is, with respect to an incident light 50 that is incident toward the workpiece 1, the reflected light 51 may be the total sum of a first reflected light 51a, which is reflected from an upper surface of the thin film 20, a second reflected light 51b, which passes through an inside of the thin film 20, is reflected from a boundary surface between a lower surface of the thin film 20 and an upper surface of the substrate 10, and then is emitted to an outside of an upper surface of the thin film 20, and a third reflected light 51c, which passes through the inside of the thin film 20, is reflected from the boundary surface between the lower surface of the thin film 20 and the upper surface of the substrate 10 to reach the upper surface of the thin film 20, is re-reflected from the upper surface of the thin film 20, is re-reflected from the boundary surface between the lower surface of the thin film 20 and the upper surface of the substrate 10, and then is emitted to the outside of the upper surface of the thin film 20.

The total sum of respective electric field signals of the first to third reflected lights 51a, 51b, and 51c may be the electric signal E of the reflected light 51. In this case, if it is assumed that the electric field signal of the incident light 50 is Ei, the electric field signal E of the reflected light 51 may be expressed as follows.

$$E = \frac{r_{01} + r_{12}e^{-j2\beta}}{1 + r_{01}r_{12}e^{-j2\beta}} E_i = (A + Bj)E_i \text{ where}$$ [Equation 1]

$$\beta = kdn\cos\theta_1$$

Here, $r_{01}$ denotes a reflectivity on a boundary surface between air and the thin film 20, and $r_{12}$ denotes a reflectivity on a boundary surface between the thin film 20 and the substrate 10.

The thickness information d of the thin film 20 may be determined by measuring the amplitude and phase of the electric field signal E of the reflected light 51. Since the detection speed of the signal detector 100 is low in comparison to the frequency of the electric field signal E, an average strength (i.e., intensity) of the electric field signal can be acquired through the signal detector 100 using Equation 2 below.

$$I(x,y,k,d) = |E(x,y)|^2 = i_0(k,d)[1+\gamma(k,d)\cos(\psi(k,d))]$$
where, $\psi(k,d) = \arctan(B/A)$ [Equation 2]

The intensity 1(k) of the electric field signal E is illustrated in FIG. 3. In the film structure including the substrate 10 and the thin film 20, the electric field signal E, which is multi-reflected on respective boundary surfaces and is detected through the signal detector 100, appears in a form in which a direct current (DC) component and an alternating current (AC) component are mixed with each other in a plurality of wavelength bands. In the case of detecting the intensity of light for each wavelength band through the signal detector 100, the intensity appears in a form in which the intensity is modulated with respect to the wavelength axis as shown in FIG. 3. In this case, if the thickness of the thin film 20 is changed, the phase value of the electric field signal E that is detected through the signal detector 100 is changed to cause the degree of modulation for a plurality of wavelength bands to be changed.

The signal detector 100 can detect the electric field signal E according to the wavelength of the reflected light 51. That is, the reflected light 51 that is reflected from the upper surface of the thin film 20 may be light having a plurality of wavelength bands. In this case, the signal detector 100 can detect the electric field signal E of the reflected light 51 for the plurality of wavelength bands as exemplarily illustrated in FIG. 3.

The FFT generator 200 performs FFT with respect to the electric field signal E to separate the DC component and the AC component of the electric field signal E from each other. Referring to FIG. 4, the result of performing the FFT with respect to the electric field signal E of the reflected light 51 that is reflected from the thin film 20 is illustrated. In this case, the DC component appears as a peak component having a large amplitude value, and the AC component appears as a peak curve having a relatively small amplitude value in the plurality of wavelength bands.

The thickness information of the thin film 20 is included in the phase value of the AC component. Accordingly, by analyzing the FFT signal through windowing of only the AC component in a specific wavelength band, the thickness information of the thin film 20 can be known. In this case, it is advantageous to perform an Inverse Fast Fourier Transform (IFFT) with respect to the AC component in the specific wavelength band. That is, it is advantageous to perform IFFT with respect to the windowed component.

It is possible to measure the thickness of the thin film using only the FFT. In such a case, values in the vicinity of the peak position of the AC component of the electric field signal E (e.g., the values of within the dotted-line showing the windowed portion in FIG. 4) may be acquired to measure the thickness of the thin film. By contrast, according to exemplary embodiments, the thickness of the thin film is measured using skew IFFT. Accordingly, by performing the IFFT with respect to the FFT signal of the electric field signal E through windowing of an AC component in a specific wavelength band, the phase value of the AC component can be extracted without distortion of the information.

FIG. 5 shows the result of windowing the FFT signal of the AC component in the specific wavelength band as the result of performing the FFT with respect to the electric field signal E. That is, FIG. 5 shows the windowed AC component that is indicated by dotted-lines in FIG. 4. The IFFT is performed with respect to the FFT signal of the AC component illustrated in FIG. 5.

The IFFT generator 300 receives the AC component of the electric field signal E that has been windowed, performs the IFFT with respect to the received AC component, and extracts the phase value P of the input AC component.

FIG. 6 shows the phase value P that is extracted by performing the skew IFFT with respect to the FFT signal of the AC component illustrated in FIG. 5. As shown in FIG. 6, the phase value P that is extracted by the IFFT generator 300 appears in a periodically wrapped form. Accordingly, it is advantageous to unwrap the phase value.

The thickness analyzer 410 unwraps the phase value and determines the thickness of the thin film 20 using the phase value P. That is, the thickness analyzer 410 determines the slope of the phase value P to measure the thickness of the thin film 20.

FIG. 7 shows a result of unwrapping the phase value P that is periodically wrapped as shown in FIG. 6. By unwrapping the wrapped phase value P, the total phase value of the reflected lights that are multi-reflected on the respective boundary surfaces of the thin film 20 can be obtained. In this case, if it is assumed that the thickness value of the thin film 20 is linear with respect to the phase value in the specific wavelength band, the thickness value of the thin film 20 can be known by determining the slope of the unwrapped phase value.

The thickness analyzer 410 measures the thickness of the thin film 20 by determining the slope of the phase value in the specific wavelength band of the reflected light 51. In this case, the thickness analyzer 410 measures the thickness of the thin film 20 by performing offset compensation with respect to the slope of the phase value. As illustrated in FIG. 7, the thickness analyzer 410 measures the thickness of the thin film 20 by performing the offset compensation with an offset compensation value that corresponds to a difference between a resultant value of the simulation and a theoretical value.

Various exemplary embodiments of the FFT generator 200, the IFFT generator 300, and the thickness analyzer 400 as described above may be implemented in a recording medium that can be read by a computer or a similar device using software, hardware, or a combination thereof. According to exemplary embodiments, data of the electric field signal E of the reflected light 51 that is reflected from the surface of the thin film 50 may be transferred as input data of the software or hardware as described above.

According to the hardwired implementation, the exemplary embodiments may be implemented, for example, using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electrical circuits for performing the various functions.

According to the software implementation, exemplary embodiments of the procedures or functions may be implemented together with a separate software module that operates, in conjunction with one or more microprocessors, to perform at least one function or operation. Software code may be implemented by a software application that is written in an appropriate program language.

Although FIG. 2 illustrates that a thin film 20 is formed on a substrate 10, a plurality of thin films may be formed on the substrate 10. This is because a plurality of thin film forming processes may be included in a semiconductor wafer manufacturing process, and in this case, a plurality of thin films are vertically formed on the substrate 10.

In this case, the number of multi-reflecting surfaces are increased due to the plurality of thin films, and the reflected lights that are reflected from the plurality of thin films may have more complicated electric field signals. Even in this case, however, according to the skew analysis according to the exemplary embodiments, measurement of the thickness of the whole thin film on the substrate 10 is performed before a process of forming the thin film that is positioned on the uppermost portion is performed, measurement of the thickness of the whole thin film on the substrate 10 is performed again after the thin film that is positioned on the uppermost portion is formed, and the thickness of the thin film that is positioned on the uppermost portion is determined by a difference between the measurement values before and after forming the uppermost portion.

As described above, in the case where a plurality of thin films are formed on the substrate 10, the reflected light that is reflected from the plurality of thin films may be the total sum of the reflected lights which are reflected from the boundary surfaces of the plurality of thin films and are emitted to the outside, and the electric field signal of the reflected light may be detected by the signal detector 100. The phase value may be determined using the electric field signal, and in this case, the phase value may be the total sum of the phase values of the reflected lights which are reflected from the boundary surfaces of the plurality of thin films and are emitted to the outside.

In the case where a plurality of thin films exist on the substrate 10, in order to measure the thickness of a specific thin film using the reflected lights which are reflected from the boundary surfaces of the plurality of thin films and are emitted to the outside, it is advantageous to remove the influence, which is exerted by the thin film thicknesses and physical values, from the acquired phase value. Accordingly, it is advantageous to perform simulations based on modeling of the respective thin films. However, in this case, the analysis becomes quite complex. In order to address the complexity of such an analysis, a skew analyzing method according to exemplary embodiments is used. The skew analyzing method can remove the phase change values that are caused by the lower thin films through measurement of the thickness of the final thin film using spectrums before and after spreading the final thin film.

That is, using both the spectrum that is acquired before the final thin film is spread and the spectrum that is acquired after the final thin film is spread, the phase value spectrum per wavelength, which is affected by the thickness value of the final thin film, may be obtained.

As the skew analyzing method, the phase value spectrum may be acquired by using a ratio spectrum that is obtained by dividing the spectrum that is acquired after the final thin film is spread by the spectrum that is acquired before the thin film is spread, and a difference spectrum that is obtained by subtracting the spectrum that is acquired before the final thin film is spread from the spectrum that is acquired after the final thin film is spread. Further, as the skew analyzing method, phase value spectrums, which are acquired from the spectrum that is acquired after the final thin film is spread and the spectrum that is acquired before the final thin film is spread, may be divided by or subtracted from each other.

The skew analyzing method that can measure the thickness information of the final thin film most accurately may differ depending on the structures of the lower thin films.

Further, if needed, the thickness value of the final thin film may be accurately measured by obtaining a difference between a slope value for a phase value acquired in the wavelength band that is most consistent with the thickness change of the final thin film and a slope value for a phase value acquired in the wavelength band that is most consistent with the thickness change of the lower thin films.

Figure 8:
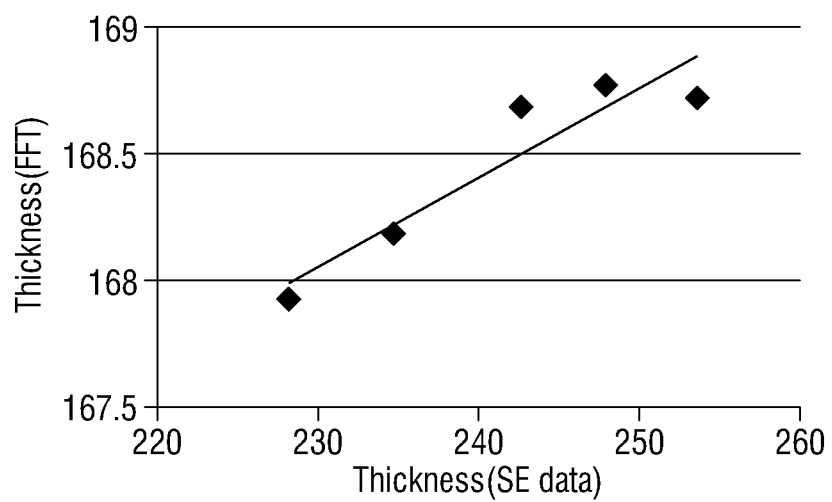
FIG. 8 is a graph comparatively illustrating a result of measuring a thickness of a thin film using FFT and a result of actually measuring a thickness of a thin film.
Figure 9:
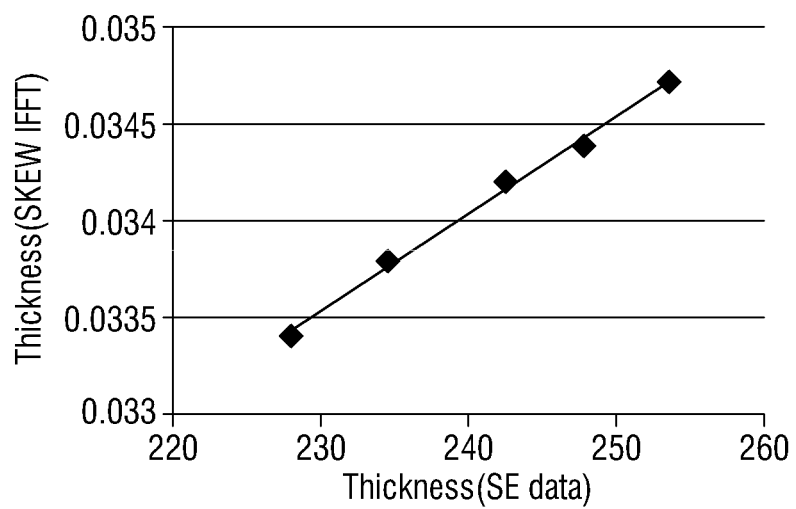
FIG. 9 is a graph comparatively illustrating a result of measuring a thickness of a thin film using skew IFFT and a result of actually measuring a thickness of a thin film.

FIG. 8 is a graph comparatively illustrating a result of measuring the thickness of a thin film using FFT and a result of actually measuring the thickness of a thin film, and FIG. 9 is a graph comparatively illustrating a result of measuring the thickness of a thin film using skew IFFT and a result of actually measuring the thickness of a thin film.

FIG. 8 comparatively illustrates the result of measuring the thickness of an oxidized thin film using a spectroscopic ellipsometer (SE) and the result of measuring the thickness of the oxidized thin film using FFT after the oxidized thin film is deposited. Further, FIG. 9 comparatively illustrates the result of measuring the thickness of an oxidized thin film using a spectroscopic ellipsometer (SE) and the result of measuring the thickness of the oxidized thin film using skew IFFT after the oxidized thin film is deposited.

For the deposition conditions of FIGS. 8 and 9, the oxidized thin films are produced with thicknesses of 232 Å, 237 Å, 242 Å, 247 Å, and 252 Å. Referring to FIGS. 8 and 9, in the case where the skew IFFT according to exemplary embodiments is used, it can be known that the operated thickness value of the oxidized thin film has high correlation with the thickness of the actual oxidized thin film as compared with the case where the FFT is used with respect to the same spectrum.

Hereinafter, a system for measuring the thickness of a thin film according to some exemplary embodiments of the present inventive concept will be described.

Figure 10:
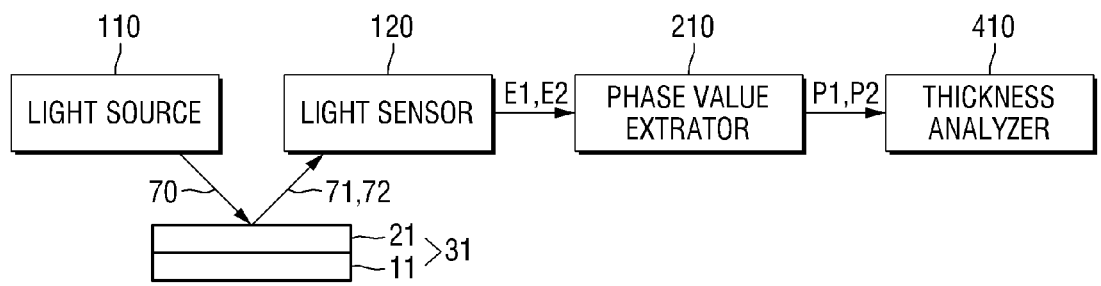
FIG. 10 is a block diagram schematically illustrating a system for measuring the thickness of a thin film according to an exemplary embodiment.
Figure 11:
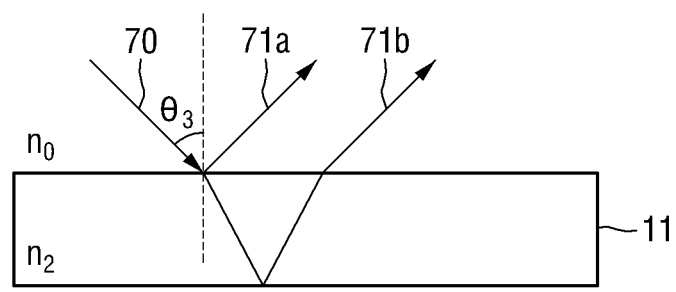
FIG. 11 is a diagram illustrating reflected light that is reflected from a substrate using the system of FIG. 10.
Figure 12:
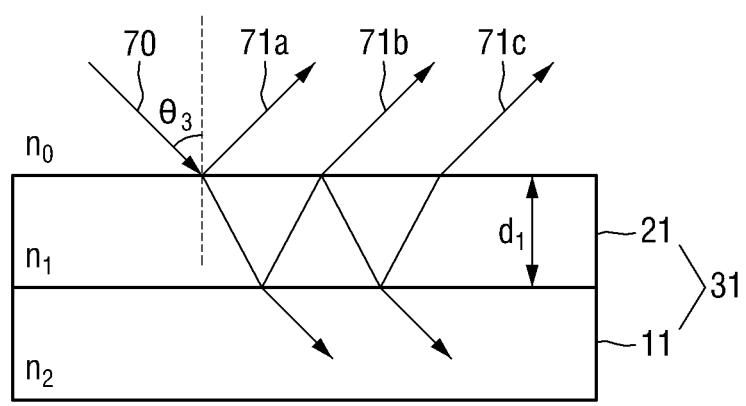
FIG. 12 is a diagram illustrating reflected light that is reflected from a thin film using the system of FIG. 10.

FIG. 10 is a block diagram schematically illustrating a system for measuring a thickness of a thin film according to an exemplary embodiment. FIG. 11 is a diagram illustrating reflected light that is reflected from a substrate of the system of FIG. 10, and FIG. 12 is a diagram illustrating reflected light that is reflected from a thin film of the system of FIG. 10.

Referring to FIG. 10, a system for measuring the thickness of a thin film includes a light source 110, a light sensor 120, a phase value extractor 210, and a thickness analyzer 410.

The light source 110 irradiates the surface of a workpiece 31 with measurement light 70 that is at a threshold angle and that includes a plurality of wavelength bands. The threshold angle may be predetermined. Alternatively, the light source 110 may emit measurement light 70 having a single wavelength. The workpiece 31 may include a substrate 11 (as shown in FIG. 11) or a substrate 11 having a thin film 21 deposited thereon (as show in FIG. 12).

The light sensor 120 receives light reflected from the workpiece 31. For example, the light sensor 120 may receive first reflected lights 71a and 71b that are reflected from the substrate 11 (see FIG. 11), or second reflected lights 72a, 72b, and 72c that are reflected from the substrate 11 having the thin film 21 (see FIG. 12), and senses a first electric field signal E1 or a second electric field signal E2.

Referring to FIG. 11, before the thin film 21 is deposited on the substrate 11, the light source 110 irradiates the substrate 11 with the measurement light 70, and the first reflected lights 71a and 71b are reflected from the substrate 11. The first reflected lights 71a and 71b include the reflected light 71a that is reflected from an upper surface of the substrate 11 and the reflected light 71b that passes through the substrate 11, is reflected from a lower surface of the substrate 11, and is emitted to an outside of the substrate 11.

Referring to FIG. 12, after the thin film 21 is deposited on the substrate 11, the light source 110 irradiates the thin film 21 with the measurement light 70, and the second reflected lights 72a, 72b, and 72c are reflected from the thin film 21. The second reflected lights 72a, 72b, and 72c include the reflected light 72a that is reflected from an upper surface of the thin film 21, the reflected light 72b, which passes through an inside of the thin film 21, is reflected from a boundary surface between a lower surface of the thin film 21 and an upper surface of the substrate 11, and then is emitted to an outside of an upper surface of the thin film 21, and the reflected light 72c, which passes through the inside of the thin film 21, is reflected from the boundary surface between the lower surface of the thin film 21 and the upper surface of the substrate 11 to reach the upper surface of the thin film 21, is re-reflected from the upper surface of the thin film 21, is re-reflected from the boundary surface between the lower surface of the thin film 21 and the upper surface of the substrate 11, and then is emitted to the outside of the upper surface of the thin film 21.

The light sensor 120 senses an electric field from the reflected lights. For example, in the case of the substrate 11, the light sensor 120 senses a first electric field signal E1 from the first reflected lights 71a and 71b. In the case of the thin film 21, the light sensor 120 senses a second electric field signal E2 from the second reflected lights 72a, 72b, and 72c.

In this case, the first reflected lights 71a and 71b may include a plurality of wavelength bands, and the second reflected lights 72a, 72b, and 72c may include a plurality of wavelength bands. In the case of the substrate 11, the light sensor 120 may sense the first electric field signal E1 for the plurality of wavelength bands with respect to the first reflected lights 71a and 71b. In the case of the thin film 21, the light sensor 120 may sense the second electric field signal E2 for the plurality of wavelength bands with respect to the second reflected lights 72a, 72b, and 72c.

The phase value extractor 210 performs FFT and IFFT with respect to the electric field and extracts a phase value of an AC component of the electric field. For example, in the case of the substrate 11, the phase value extractor 210 performs FFT and IFFT with respect to the first electric field signal E1 and extracts a first phase value P1 of the AC component of the first electric field signal E1. In the case of the thin film 21, the phase value extractor 210 performs FFT and IFFT with respect to the second electric field E2 and extracts a second phase value P2 of the AC component of the second electric field signal E2.

The phase value extractor 210 may perform the FFT with respect to the first electric field signal E1 to separate the DC component and the AC component of the first electric field signal E1. The phase value extractor 210 may perform the IFFT with respect to the AC component of the first electric field signal E1 in a specific band (e.g., that has been selected by windowing) to extract the first phase value P1.

Further, the phase value extractor 210 may perform the FFT with respect to the second electric field signal E2 to separate the DC component and the AC component of the second electric field signal E2. The phase value extractor 210 may perform the IFFT with respect to the AC component of the second electric field signal E2 in a specific band (e.g., that has been selected by windowing) to extract the second phase value P2.

The thickness analyzer 410 determines the thickness of the thin film 21 using slope values. For example, in the case of the substrate 11, the thickness analyzer 410 determines the slope value of the first phase value P1. The thickness analyzer 410 may store the slope value of the first phase value P1. In the case of the thin film 21, the thickness analyzer 410 determines the slope value of the second phase value P2, and measures the thickness of the thin film 21 using the slope values.

In this case, the thickness analyzer 410 may determine the slope value of the first phase value P1 in a specific wavelength band for the first reflected lights 71a and 71b, and may determine the slope value of the second phase value P2 in a specific wavelength band for the second reflected lights 72a, 72b, and 72c. The thickness analyzer 410 may use the specific wavelength band that is consistent with the thickness information of the thin film 21.

The thickness analyzer 410 may measure the thickness of the thin film 21 by performing offset compensation with respect to the slope value of the first phase value P1 and the slope value of the second phase value P2.

Figure 13:
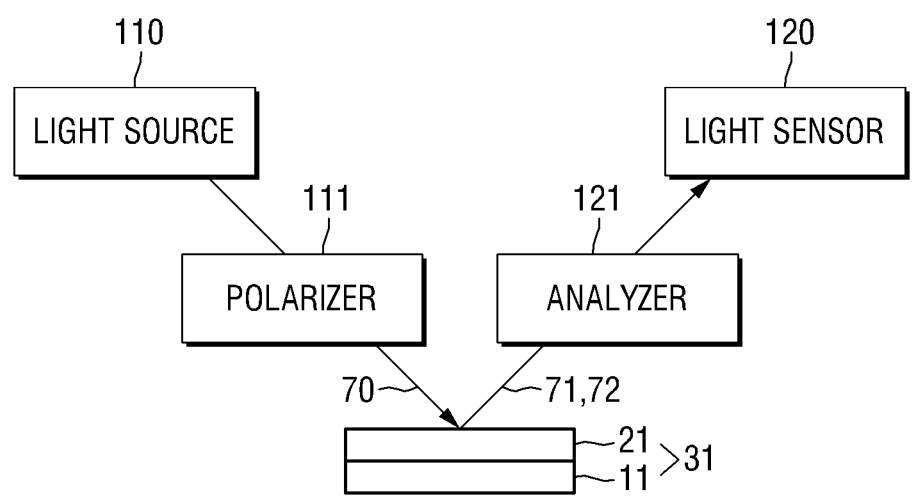
FIG. 13 is a block diagram schematically illustrating a part of a system for measuring the thickness of a thin film according to another exemplary embodiment.

FIG. 13 is a block diagram schematically illustrating a part of a system for measuring a thickness of a thin film according to another exemplary embodiment.

Referring to FIG. 13, a system for measuring the thickness of a thin film according to another exemplary embodiment is similar to the system of FIG. 10, but further includes a polarizer 111 and an analyzer 121. Since the light source 110 and the light sensor 120 are the same as those in FIG. 10, repeated description will be omitted here.

That is, the system for measuring the thickness of a thin film according to another exemplary embodiment may further include the polarizer 111 provided between the light source 110 and the workpiece 31. The measurement light emitted from the light source 110 may be linearly polarized by the polarizer 111.

Further, the system for measuring the thickness of a thin film according to another exemplary embodiment may further include the analyzer 121 provided between the workpiece 31 and the light sensor 120. The analyzer 121 may analyze the polarization change of the first reflected lights 71a and 71b (see FIG. 11), or of the second reflected lights 72a, 72b, and 72c (see FIG. 12). According to another exemplary embodiment, the system for measuring the thickness of a thin film may further include a compensator or a phase modulator.

The system for measuring the thickness of a thin film according to the present inventive concept may include non-contact non-destructive measurement equipment that can test an object to be measured without processing or modifying the object. The measurement equipment may be, for example, a spectroscopic ellipsometer (SE). Unlike a single-wavelength ellipsometry that uses a light source of a single wavelength, the spectroscopic ellipsometer can precisely measure various characteristics of the object to be measured using, for example, a light source having a wide band.

Hereinafter, a method for measuring the thickness of a thin film according to an exemplary embodiment will be described.

Figure 14:
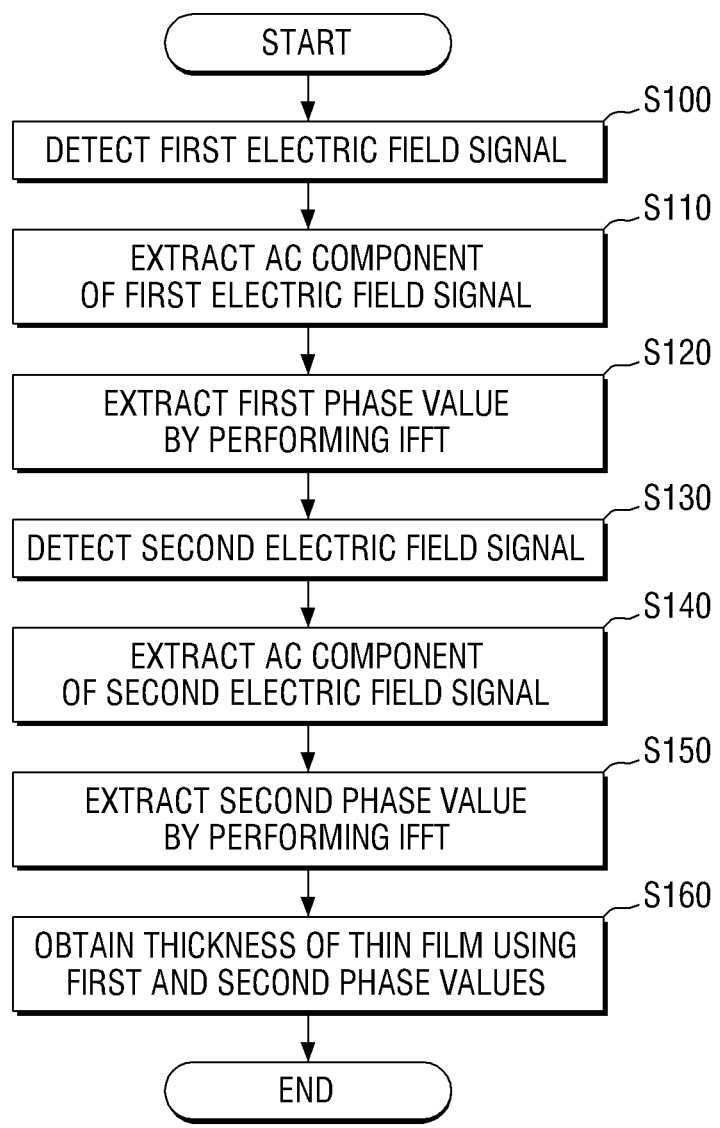
FIG. 14 is a flowchart sequentially illustrating a method for measuring the thickness of a thin film according to an exemplary embodiment.

FIG. 14 is a flowchart sequentially illustrating a method for measuring the thickness of a thin film according to an exemplary embodiment.

Referring to FIG. 14, a method for measuring the thickness of a thin film detects a first electric field signal (S100). For example, the method may detect a first electric field signal E1 of a first reflected light R1 that is reflected from a substrate S by providing a measurement light to the substrate S before a thin film TF is deposited on the substrate S.

The substrate S may be, for example, a substrate having a thickness, such as a Si substrate, a glass substrate, or a sapphire substrate, and may be a substrate having a laminated structure, such as a Silicon On Insulator (SOI) substrate. Further, according to some exemplary embodiments, a pattern having various structures may be formed on the substrate S.

Then, an AC component of the first electric field signal is extracted (S110). For example, an FFT is performed with respect to the first electric field signal E1 to separate the DC component and the AC component of the first electric field signal E1.

The thickness information of the thin film TF is included in the phase value of the AC component of the first electric field signal E1. Accordingly, by analyzing the FFT signal through windowing of the AC component in a specific wavelength band, the thickness information of the thin film TF can be known.

A first phase value is extracted by performing IFFT (S120). For example, IFFT is performed with respect to the AC component of the first electric field signal E1 to extract a first phase value P1.

After the thin film TF is deposited on the substrate S, a second electric field signal is detected (S130). For example, a second electric field E2 of a second reflected light R2 that is reflected from the thin film TF is detected through providing of the measurement light L1 to the thin film TF. An AC component of the second electric field signal is extracted (S140). For example, the DC component and the AC component of the second electric field signal E2 are separated from each other by performing FFT with respect to the second electric field signal E2. A second phase value is extracted by performing IFFT (S150). For example, a second phase value P2 is extracted by performing IFFT with respect to the AC component of the second electric field signal E2.

The thickness of the thin film TF is obtained using the first phase value and the second phase value (S160). For example, the thickness of the thin film TF is obtained by using the first phase value P1 and the second phase value P2. In this case, a first slope S1 of the first phase value P1 and a second slope S2 of the second phase value P2 are obtained and compared with each other. That is, the thickness of the thin film TF is obtained using skew analysis.

The first reflected light R1 and the second reflected light R2 may each include a plurality of wavelength bands. The first phase value P1 may be extracted from a specific wavelength band of the first reflected light R1, and the second phase value P2 may be extracted from a specific wavelength band of the second reflected light R2, and the first slope S1 and the second slope S2 may be obtained, respectively.

In the process of obtaining the thickness of the thin film TF, offset compensation may be performed with respect to the first slope S1 and the second slope S2.

Figure 15:
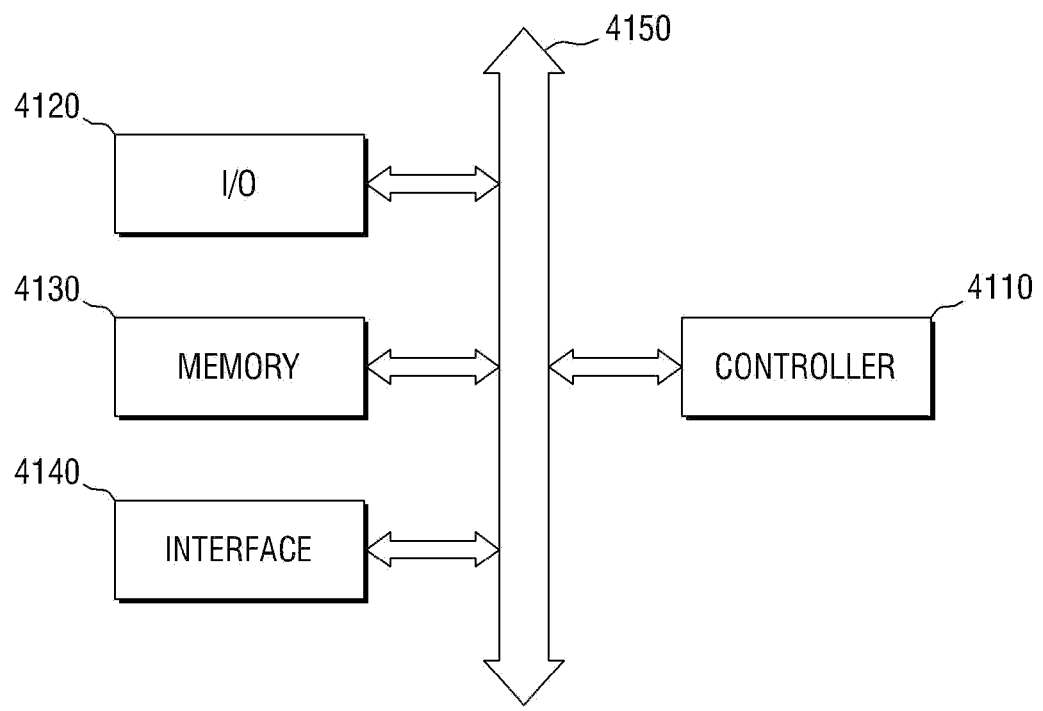
FIG. 15 is a block diagram of an electronic system including a semiconductor device formed using an apparatus for measuring the thickness of a thin film according to some exemplary embodiments.

FIG. 15 is a block diagram of an electronic system including a semiconductor device formed using an apparatus for measuring the thickness of a thin film according to some exemplary embodiments.

Referring to FIG. 15, an electronic system 4100 may include a controller 4110, an input/output (I/O) 4120, a memory 4130, an interface 4140, and a bus 4150. The controller 4110, the I/O 4120, the memory 4130 and/or the interface 4140 may be connected to each other through the bus 4150. The bus 4150 corresponds to paths through which data is transferred.

The controller 4110 may include at least one of a microprocessor, a digital signal processor, a microcontroller, and logic elements that can perform similar functions. Alternatively, the controller 4110 may include, for example, a plurality of microprocessors.

The I/O 4120 may include a keypad, a keyboard, and/or a display device.

The memory 4130 may store data and/or commands.

The interface 4140 may function to transfer the data to a communication network or receive the data from the communication network. The interface 4140 may be of a wired or wireless type. For example, the interface 4140 may include an antenna or a wire/wireless transceiver.

The electronic system 4100 may further include a high-speed DRAM and/or SRAM as an operating memory for improving the operation of the controller 4110. The semiconductor device that is formed using the apparatus for measuring the thickness of a thin film according to an exemplary embodiment of the present inventive concept may be provided in the memory 4130 or may be provided as a part of the controller 4110 or the I/O 4120.

The electronic system 4100 may be applied to a Personal Digital Assistant (PDA), a portable computer, a web tablet, a wireless phone, a mobile phone, a digital music player, a memory card, or any electronic device that can transmit and/or receive information in wireless environments.

Figure 16:
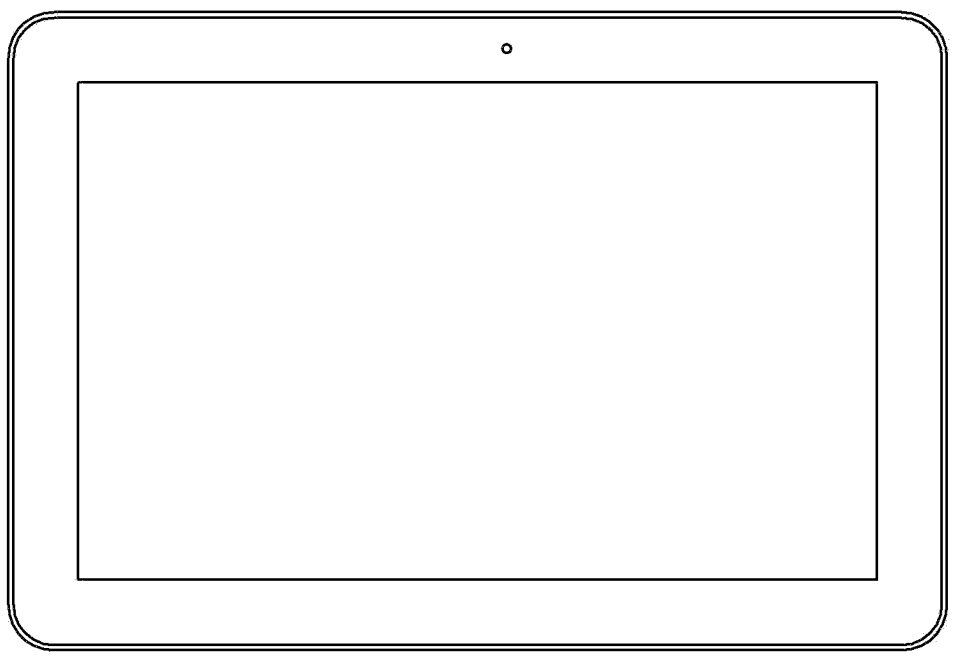
FIGS. 16 and 17 are views of an exemplary semiconductor systems to which a semiconductor device formed using an apparatus for measuring the thickness of a thin film according to some exemplary embodiments can be applied.
Figure 17:
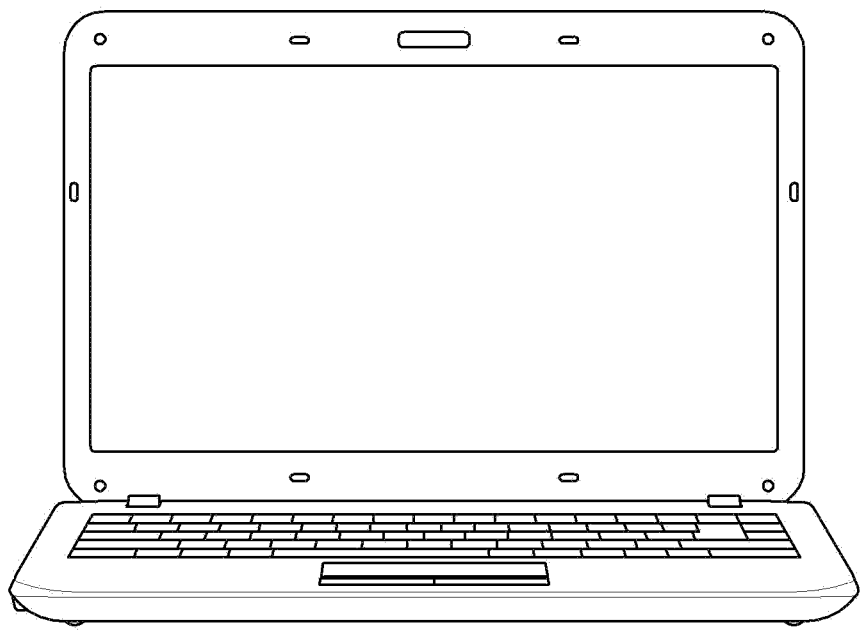

FIGS. 16 and 17 are views of an exemplary semiconductor system to which a semiconductor device formed using an apparatus for measuring the thickness of a thin film according to some exemplary embodiments can be applied.

FIG. 16 illustrates a tablet PC, and FIG. 17 illustrates a notebook computer. The semiconductor device that is formed using the apparatus for measuring the thickness of a thin film according to an exemplary embodiment may be used in the tablet PC or the notebook computer. It will be apparent to those of skill in the art that the semiconductor device that is formed using the apparatus for measuring the thickness of a thin film according to exemplary embodiments may be applied even to other integrated circuit devices that have not been exemplified.

Although certain exemplary embodiments have been described for illustrative purposes, those skilled in the art will appreciate that various modifications, additions and substitutions are possible, without departing from the scope and spirit of the inventive concept as set forth in the accompanying claims.

What is claimed is:

1. An apparatus for measuring a thickness of a thin film, the apparatus comprising:
   a signal detector configured to detect an electric field signal with respect to a reflected light that is reflected from a thin film;
   a Fast Fourier Transform (FFT) generator configured to perform FFT with respect to the electric field signal to separate a direct current (DC) component and an alternating current (AC) component of the electric field signal from each other;
   an Inverse Fast Fourier Transform (IFFT) generator configured to receive the separated AC component of the electric field signal, perform IFFT with respect to the AC component, and extract a phase value of the AC component; and
   a thickness analyzer configured to measure the thickness of the thin film using the phase value.

2. The apparatus of claim 1, wherein the IFFT generator receives only the separated AC component,
   wherein the apparatus is configured to extract a first phase value based on a first electric field signal of a first reflected light that is reflected from the thin film before a process is performed, and a second phase value based on a second electric field signal of a second reflected light that is reflected from the thin film after the process is performed, and
   wherein the thickness analyzer is configured to measure the thickness of the thin film using the first phase value and the second phase value.

3. The apparatus of claim 1, wherein the signal detector is configured to detect the electric field signal according to a wavelength of the reflected light.

4. The apparatus of claim 3, wherein the thickness generator is configured to obtain a slope of the phase value to measure the thickness of the thin film.

5. The apparatus of claim 4, wherein the thickness generator is configured to obtain the slope of the phase value in a specific wavelength band of the reflected light.

6. The apparatus of claim 4, wherein the thickness generator is configured to perform offset compensation with respect to the slope to measure the thickness of the thin film.

7. The apparatus of claim 1, wherein the thin film comprises a plurality of layers.

8. The apparatus of claim 7, wherein the reflected light is a sum of a plurality of reflected lights that are reflected from the plurality of layers.

9. The apparatus of claim 8, wherein the phase value is a sum of a plurality of phase values obtained based on the plurality of reflected lights.

10. A system for measuring a thickness of a thin film, the system comprising:
    a light source configured to provide light to a substrate on which a thin film is deposited;
    a light sensor configured to receive a first reflected light that is reflected from the substrate and sense a first electric field signal of the first reflected light;
    a phase value extractor configured to perform a Fast Fourier Transform (FFT) and an Inverse Fast Fourier Transform (IFFT) with respect to the first electric field signal to extract a first phase value of an alternating current (AC) component of the first electric field signal; and
    a thickness analyzer configured to obtain a first slope of the first phase value to measure the thickness of the thin film,
    wherein the thickness analyzer is further configured to obtain a second slope of a second phase value that is extracted from a second electric field signal of a second reflected light that is reflected from the substrate before the thin film is deposited, and measure the thickness of the thin film based on the first slope and the second slope.

11. The system of claim 10, wherein each of the first reflected light and the second reflected light includes a plurality of wavelength bands.

12. The system of claim 11, wherein the light sensor is configured to sense the first electric field signal according to the wavelengths of the first reflected light, and senses the second electric field signal according to wavelengths of the second reflected light.

13. The system of claim 12, wherein the thickness analyzer is configured to obtain the first slope and the slope in a specific wavelength band of the first reflected light and the second reflected light, respectively.

14. The system of claim 12, wherein the thickness analyzer is configured to perform offset compensation with respect to the first slope and the second slope.

15. The system of claim 10, wherein the phase value extractor is configured to perform the FFT with respect to the first electric field signal to separate a direct current (DC) component and the AC component of the first electric field signal from each other.

16. The system of claim 15, wherein the phase value extractor is configured to perform the IFFT with respect to only the AC component of the first electric field signal to extract the first phase value.

17. A method of determining a thickness of a thin film, the method comprising:
    detecting a first electric field signal with respect to a first reflected light that is reflected from a workpiece before depositing of the thin film;
    performing a Fast Fourier Transform (FFT) on the first electric field signal to separate a direct current (DC) component from an alternating current (AC) component of the first electric field signal;
    performing an Inverse Fast Fourier Transform (IFFT) on the AC component to extract a first phase value of the AC component;
    depositing the thin film on the workpiece;
    detecting a second electric field with respect to a second reflected light that is reflected from the workpiece after depositing the thin film on the workpiece;

performing FFT on the second electric field signal to separate a DC component from an AC component of the second electric field signal;

performing IFFT on the AC component of the second electric field signal to extract a second phase value of the AC component; and determining a thickness of the thin film using the first phase value and the second phase value.

18. The method of claim 17, wherein the workpiece is a substrate.

19. The method of claim 17, wherein the workpiece comprises a substrate and at least one thin film deposited on the substrate prior to detecting the first electric field signal.

20. The method of claim 17, wherein the determining the thickness of the thin film comprises determining the thickness of the thin film by subtracting a slope of the first phase value from a slope of the second phase value.

* * * * *